United States Patent
Takei et al.

(10) Patent No.: US 8,380,411 B2
(45) Date of Patent: Feb. 19, 2013

(54) FLOW RATE CONTROL VALVE FOR CLUTCH CONTROL DEVICE

(75) Inventors: Yoshihiro Takei, Kanagawa (JP); Yasushi Yamamoto, Kanagawa (JP); Hiroyuki Kawanishi, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 164 days.

(21) Appl. No.: 12/737,988

(22) PCT Filed: Sep. 16, 2009

(86) PCT No.: PCT/JP2009/066138
§ 371 (c)(1),
(2), (4) Date: Mar. 7, 2011

(87) PCT Pub. No.: WO2010/032742
PCT Pub. Date: Mar. 25, 2010

(65) Prior Publication Data
US 2011/0168515 A1    Jul. 14, 2011

(30) Foreign Application Priority Data
Sep. 19, 2008  (JP) ................. 2008-240532

(51) Int. Cl.
*G07F 7/00* (2006.01)
*G07F 17/00* (2006.01)

(52) U.S. Cl. ......... 701/68; 192/3.28; 192/3.29; 192/3.3; 192/85.63; 192/85.01; 191/221; 477/70; 477/77; 477/78; 477/57; 74/730.1; 74/731.1; 74/732

(58) Field of Classification Search .............. 701/60, 701/67, 68; 192/85.01, 3.28, 3.29, 3.3, 85.63; 74/730.1, 731; 191/221; 477/70, 77, 48
See application file for complete search history.

(56) References Cited

U.S. PATENT DOCUMENTS 4,509,125 A * 4/1985 Fattic et al. ............... 701/61
4,649,485 A * 3/1987 Osanai et al. .............. 701/60

(Continued)

FOREIGN PATENT DOCUMENTS

JP     8-74530 A    3/1996
JP     11-108081 A  4/1999

(Continued)

OTHER PUBLICATIONS

A proportional microvalve using a bi-stable magnetic actuator; Shinozawa, Y.; Abe, T.; Kondo, T.; Micro Electro Mechanical Systems, 1997. MEMS '97, Proceedings, IEEE., Tenth Annual International Workshop on; Digital Object Identifier: 10.1109/MEMSYS. 1997.581809; Publication Year: 1997 , pp. 233-237.*

(Continued)

*Primary Examiner* — Cuong H Nguyen
(74) *Attorney, Agent, or Firm* — McGinn IP Law Group, PLLC

(57) ABSTRACT

A clutch control device for vehicle equipped with a clutch actuator driven by a working fluid, wherein secular change in the flow rate control valve for controlling the working fluid is compensated, and the rate of connection of the clutch is correctly controlled by a simple means. To control the stroke of a clutch actuator 110, the clutch control device is provided with a single flow rate control valve 1 that controls the feed and discharge of the working fluid by using an electromagnetic solenoid. A flow rate control valve control device 9 is provided with a learning device 91 that learns the neutral position of the flow rate control valve 1 which shuts off the flow of the working fluid, separately detects the amounts of electric current to a coil 8 of when the rate of change in the stroke becomes zero depending upon the directions in which the valve body of the flow control valve 1 moves, and learns the central point at the neutral position by averaging the detected values. In controlling the stroke of the clutch, the amount of electric current to the coil 8 is corrected based on the learned value to compensate for a change in the flow rate characteristics by secular changes.

6 Claims, 12 Drawing Sheets

U.S. PATENT DOCUMENTS

| | | | | |
|---|---|---|---|---|
| 4,653,006 A | * | 3/1987 | Osanai et al. | 701/60 |
| 4,727,771 A | * | 3/1988 | Niwa et al. | 477/48 |
| 4,729,103 A | * | 3/1988 | Oshiage et al. | 701/61 |
| 4,730,518 A | * | 3/1988 | Miyawaki | 477/49 |
| 4,811,225 A | * | 3/1989 | Petzold et al. | 701/60 |
| 5,562,071 A | | 10/1996 | Urushihata et al. | |
| 7,004,128 B2 | | 2/2006 | Majima et al. | |
| 8,265,844 B2 | * | 9/2012 | Takei et al. | 701/68 |
| 2010/0006045 A1 | | 1/2010 | Nakano et al. | |
| 2010/0094517 A1 | * | 4/2010 | Takei et al. | 701/68 |

FOREIGN PATENT DOCUMENTS

| | | | | |
|---|---|---|---|---|
| JP | 2000-104572 A | | 4/2000 | |
| JP | 2000193073 A | * | 7/2000 | |
| JP | 2000-337543 A | | 12/2000 | |
| JP | 2002-286057 A | | 10/2002 | |
| JP | 3417823 B2 | | 4/2003 | |
| JP | 2003106436 A | * | 4/2003 | |
| JP | 2003-336529 A | | 11/2003 | |
| JP | 2004-286191 A | | 10/2004 | |
| JP | 2008-175165 A | | 7/2008 | |
| JP | 2008232245 A | * | 10/2008 | |
| JP | 2010071404 A | * | 4/2010 | |
| JP | 2011033196 A | * | 2/2011 | |
| JP | 2011038615 A | * | 2/2011 | |
| JP | 2011214664 A | * | 10/2011 | |

OTHER PUBLICATIONS

Online state and parameter estimation of an electrohydraulic valve for intelligent monitoring; Khoshzaban, M.; Sassani, F.; Lawrence, P.D.; Advanced Intelligent Mechatronics '97. Final Program and Abstracts., IEEE/ASME International Conference on Digital Object Identifier: 10.1109/AIM.1997.653015; Publication Year: 1997.*

Intelligent Building Control of Water Tank Based on Fuzzy Theory; Jiang Wei; Intelligent Computation Technology and Automation (ICICTA), 2010 International Conference on; vol. 2; Digital Object Identifier: 10.1109/ICICTA.2010.788; Publication Year: 2010 , pp. 549-552.*

Low Power Piezoelectric Micro Mass Flow Controller for Liquid Fuel Injection; Schiffer, M.; Obermeier, E.; Stefanini, C.; Manente, V.; Tunestal, P.; Sensors, 2007 IEEE; Digital Object Identifier: 10.1109/ICSENS.2007.4388672; Publication Year: 2007 , pp. 1392-1395.*

* cited by examiner

Fig. 7
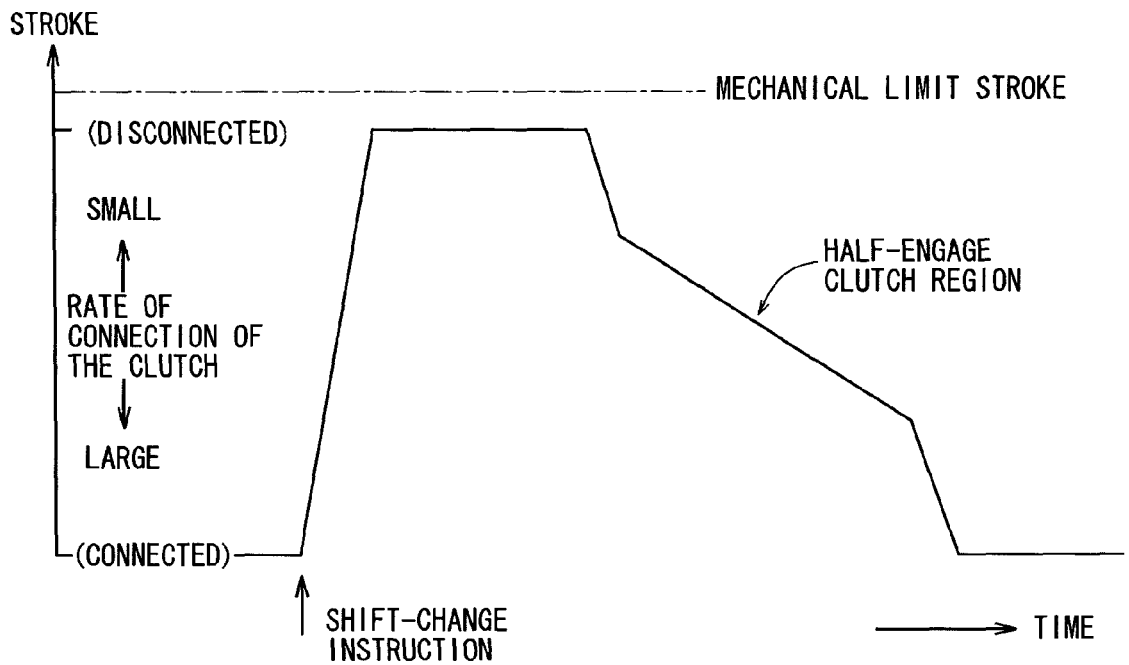
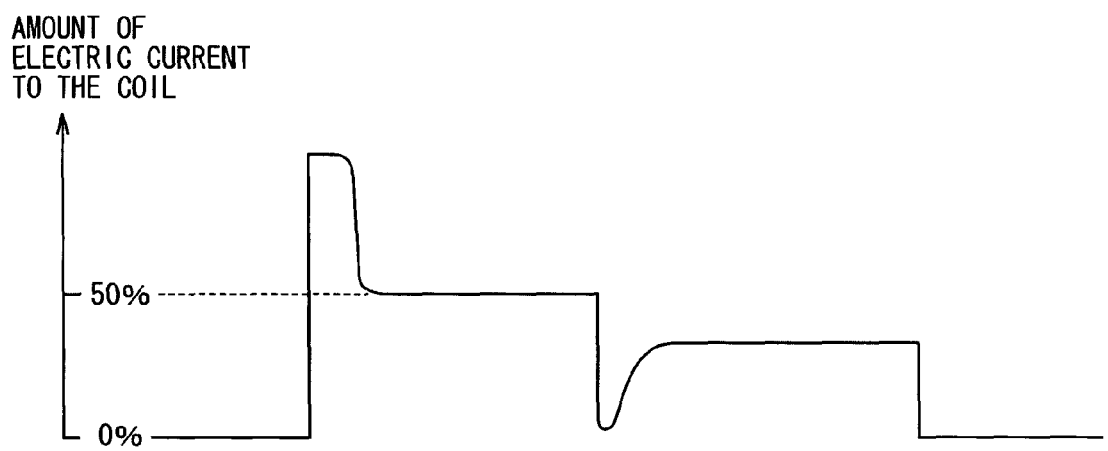

FLOW RATE CONTROL VALVE FOR CLUTCH CONTROL DEVICE

TECHNICAL FIELD TO WHICH THE INVENTION BELONGS

This invention relates to a flow rate control valve for controlling the working fluid in a clutch actuator in a clutch control device which automatically connects and disconnects a clutch provided in a vehicle by using a clutch actuator.

BACKGROUND ART

For easy driving of a vehicle and for reducing fatigue to the driver, various kinds of power transmission devices for vehicles have, in recent years, been widely used for easy driving. A representative example will be a so-called automatic transmission (AT) combining a torque converter and a planetary gear device together. A power transmission device which uses a transmission of the type of parallel shaft gear mechanism similar to the so-called manual transmission (MT) in combination with an automatic clutch, is one of such automatic power transmission devices for vehicles. In this power transmission device, a clutch disposed between an engine and a transmission is provided with a clutch actuator, and the clutch is automatically disconnected and connected at the time when the driver changes the speed by shifting the gear by using a shift lever or at the start of the vehicle eliminating the need of operating the clutch pedal by the driver. There has been further proposed a power transmission device which automatically shifts the gear depending upon the traveling condition of the vehicle by using an electronically controlled device obviating the need of operating the shift lever by the driver.

A clutch (dry type single disk clutch) installed between an engine and a transmission is provided with a clutch disk 101 which has a friction disk fixed to the peripheral portion thereof as shown in FIG. 6. The clutch is slidably spline fitted to a transmission input shaft 103 rotatably supported by a crankshaft 102 of the engine. A pressure plate 105 is provided on the back of the friction disk of the clutch disk 101 to bring the friction disk into pressed contact with a flywheel 104 at the rear end of the crankshaft 102. Further, a diaphragm spring 107 is attached to a clutch cover 106 that is fixed to the flywheel 104. When the vehicle is normally traveling, the diaphragm spring 107 brings the clutch disk 101 into pressed contact with the flywheel 104 via the pressure plate 105 and, therefore, the engine power is transmitted to the transmission input shaft 103 via the clutch disk 101.

The clutch is equipped with an operation mechanism for disconnecting and connecting the transmission of power, and the operation mechanism is constituted by a release bearing 108 fitted onto the transmission input shaft 103, a release fork 109, a clutch actuator 110 and the like. The clutch actuator 110 is a fluid pressure cylinder operated by a pneumatic pressure or a hydraulic pressure, and its piston is coupled to one end of the release fork 109. Provision is, further, made of a stopper 111 for mechanically limiting the movement in order to prevent the occurrence of damage to the clutch actuator 110 and the like caused by excessively large movement of the piston.

At the time of cutting off the engine power for shifting the gear of the transmission, the working fluid is fed to the clutch actuator 110 to displace one end of the release fork 109 toward the right in the drawing. The other end of the release fork 109 displaces toward the opposite direction, causing the release bearing 108 coming in contact therewith to slide leftward so that the diaphragm spring 107 moves as represented by a two-dot chain line in the drawing. Therefore, the spring force that pushes the pressure plate 105 is released, and the transmission of the engine power to the transmission input shaft 103 is cut off. To connect the clutch again after having finished the gear shift, the working fluid in the clutch actuator 110 is discharged, and the release fork 109 is moved leftward by a return spring 112 or the like. The state of connecting the clutch (rate of connection) is determined by the movement of the piston of the clutch actuator 110, i.e., by the stroke of the clutch actuator.

At the time of gear shifting, the clutch must be disconnected and connected quickly without causing shift shock. Therefore, at the time of connecting again the clutch that is once disconnected after having shifted the gear (after the gears are engaged), the piston of the clutch actuator 110 is, first, quickly moved in a direction of connection so as to quickly pass through an invalid region where the torque is not substantially transmitted, and the rate of connection is gradually increased in the so-called half-engage clutch region where the torque starts transmitting in order to avoid the shift shock caused by a sharp increase in the rate of connection as illustrated in a graph of FIG. 7 that shows changes in the stroke. The above control is executed by varying the amount of the working fluid in the clutch actuator 110 to correctly control the stroke thereof.

A clutch control device which automatically disconnects and connects the clutch at the time of gear shifting is provided with a working fluid pressure source such as an air tank that feeds the working fluid, a stroke sensor for detecting the movement of the piston of the clutch actuator, and control valves for controlling the amount of the working fluid in the clutch actuator. The clutch control device executes the clutch control at the time of gear shifting. Usually, the control valves are arranged in the working fluid feed pipe and in the discharge pipe, respectively. The rate of connection of the clutch is controlled by opening and closing these two control valves. There has also been known a clutch control device which feeds and discharges the working fluid in the clutch actuator by using a single flow rate control valve as disclosed in, for example, Japanese Patent No. 3417823.

In the clutch control device that uses a single flow rate control valve as shown in a circuit diagram of FIG. 8, the flow rate control valve 1 is connected to a communication passage 2 communicated with the clutch actuator 110, to a pressure source passage 4 communicated with the working fluid pressure source 3 such as an air tank, and to a discharge passage 5 for discharging the working fluid from the clutch actuator 110 and, further, three ports, i.e., a communication port 2p, a pressure source port 4p and a discharge port 5p, which are opens to the respective passages, are formed therein.

The flow rate control valve 1 of FIG. 8 is a proportional control valve of the type of slide valve equipped with a drive device of the type of electromagnetic solenoid, and works as a valve actuator for operating a valve body 6. Namely, the flow control valve 1 has such flow rate characteristics that the flow rate of the working fluid that flows therethrough varies depending upon the position of the valve body 6. The amount of electric current flowing into the electromagnetic solenoid serves as an operation amount for varying the flow rate. To control the stroke of the clutch, a flow rate control valve control device 9 is connected to the flow rate control valve 1 to control the amount of electric current to a coil 8 responsive to a detection signal from a stroke sensor 7.

As shown in detail in the operation view of FIG. 9, the valve body 6 of the flow rate control valve 1 has two lands on the way thereof, one end of the valve body 6 being coupled to a moving yoke 10 of the electromagnetic solenoid. A spring 11 is arranged at the other end of the valve body 6, and the position of the valve body 1 is determined by a balance between the magnetic force acting on the moving yoke 10 and the resilient force of the spring 11. When the flow of current to the coil 8 is interrupted (amount of current, 0%), the valve body 6 is pushed by the spring 1$i$ and assumes a position shown in FIG. 9($b$) whereby the communication port 2$p$ communicates with the discharge port 5$p$, and the working fluid in the clutch actuator 110 is discharged to the exterior permitting the clutch to be connected. If the electric current flowing into the coil 8 assumes a maximum value (100%), the valve body 6 is brought to a position shown in FIG. 9($c$) compressing the spring 11, and the communication port 2$p$ communicates with the pressure source port 4$p$. Therefore, the working fluid in the pressure source 3 is introduced into the clutch actuator 110 through the communication port 2$p$, and the clutch is disconnected. When a 50%-current flows into the coil 8, the valve body 6 is brought to a position of FIG. 9($a$), i.e., brought to the neutral position, and the communication port 2$p$ is cut off from the power source port 4$p$ and the discharge port 5$p$, so that the stroke of the clutch is maintained at a predetermined position. To control the stroke of the clutch at the time of gear shifting as shown in FIG. 7, the amount of electric current flowing into the coil is so controlled as to vary according to a pattern shown on the lower side in FIG. 7.

Here, described below is a relationship between the position of the valve body of the flow rate control valve and the flow rate. In the flow rate control valve in which the length L of the land is the same as the width W of the communication port 2$p$, the working fluid readily starts flowing if the valve body is deviated toward the right or the left from the neutral position in FIG. 9($a$). The flow rate control valve has only one neutral position at which the flow rate becomes 0, and has flow rate characteristics as represented by a two-dot chain line in FIG. 11 which shows the flow rate of the working fluid relative to the electric current that flows into the coil 8. When the above flow rate control valve is used, the amount of the working fluid in the clutch actuator 11 readily varies if deviated from the neutral position. To maintain the stroke at a predetermined position, therefore, it becomes necessary to accurately control the electric current that flows into the coil 8.

On the other hand, if the length L of the land is set to be larger than the width W of the communication port 2$p$ by only a small amount as shown in FIG. 10($a$), then a small width is imparted to the neutral position of the flow rate control valve 1. In this case, the flow rate characteristics become as represented by a solid line in FIG. 11, and the neutral position includes a dead zone DZ where the flow rate does not change despite the operation amount is varied. Therefore, despite the electric current varies to some extent due to disturbance or the like while the electric current flowing into the coil 8 has been so set as to maintain the stroke at the predetermined position, the stroke does not vary and a stable operation is realized. The dead zone DZ of the flow rate control valve 1 may also be introduced by unavoidable errors during the production in the step of producing the flow rate control valves.

In the flow rate control valve which includes the dead zone DZ, the position where the valve body 6 is brought to a halt so as to maintain a predetermined stroke while the stroke of the clutch is being controlled, varies in the direction in which the valve body 6 moves. When the valve body 6 moves toward the right in FIG. 10 to arrive at the neutral position, i.e., when the working fluid is fed to the clutch actuator 110 to operate the clutch in the direction of disconnection (stroke increases) and, thereafter, the valve body 6 is brought to the neutral position to cut off the feed, the valve body 6 stops at a position of FIG. 10($b$) (corresponds to a point P in FIG. 11) where the right end of the land of the valve body 6 closes the communication port 2$p$. Conversely, when the valve body 6 moves toward the left in FIG. 10 to arrive at the neutral position, i.e., when the working fluid is discharged from the clutch actuator 110 to operate the clutch in the direction of connection (stroke decreases) and, thereafter, the valve body 6 is brought to the neutral position to stop the discharge, the valve body 6 stops at a position of FIG. 10($c$) (corresponds to a point N in FIG. 11) where the left end of the land of the valve body 6 closes the communication port 2$p$.

PRIOR ART DOCUMENT

Patent Document

Patent document 1: Japanese Patent No. 3417823

OUTLINE OF THE INVENTION

Problems that the Invention is to Solve

In order to correctly control the rate of connection of the clutch, it is required to quickly and correctly control the amount of the working fluid in the clutch actuator by using the flow rate control valves. For this purpose, the flow rate control valve control device is storing flow rate characteristics representing a relationship between the amount of electric current to the coil of the electromagnetic solenoid and the flow rate (FIG. 11). For example, when there is a dead zone at the neutral position in the flow rate characteristics, the flow rate characteristics are stored in the form of a graph represented by a solid line in FIG. 11. By using the flow rate characteristics, the flow rate control valve control device controls the amount of electric current flowing into the coil so that the amount of electric current that represents the operation amount assumes a value that corresponds to a target flow rate.

Here, however, the individual flow rate control valves differ to some extent due to slight difference in the production process, and their flow rate characteristics representing the relationship between the amount of electric current and the flow rate differ to a slight degree depending upon the individual flow rate control valves. Further, even the same flow rate control valve may undergo a change in the flow rate characteristics due to secular change. As for a flow rate control valve in which a dead zone is present, a balance between the magnetic force of the electromagnetic solenoid and the spring may change due to secular change. In case the magnetic force has decreased, the solid line representing the flow rate characteristics in FIG. 12 moves toward the right (broken line X). In case the force of the spring has decreased, the solid line moves toward the left (broken line Y), and the dead zone DZ in the flow rate control valve similarly moves. The flow rate characteristics vary irrespective of the presence of the dead zone. If the flow rate characteristics vary, the flow rate varies despite the amount of the electric current is maintained the same. As a result, the rate of connection of the clutch cannot be quickly and correctly brought to the target value, and the shift shock occurs.

The present invention solves the above-mentioned problem that occurs due to secular changes in the flow rate control valve used in the clutch control device by using a simple means.

Means for Solving the Problem

In view of the above problem, the present invention provides a clutch control device that uses a flow rate control valve, wherein a flow rate control valve control device is provided with a learning device that learns the central point of the flow rate control valve at its neutral position, and a difference in the flow rate characteristics is compensated in order to correctly control the rate of connection of the clutch by using a simple means despite the flow rate control valve includes a dead zone. Namely, the present invention is concerned with a clutch control device in a power transmission device for vehicle having a clutch installed between an engine and a transmission, wherein:

the clutch control device includes a clutch actuator driven by a working fluid, a stroke sensor for detecting the movement of the clutch actuator, a flow rate control valve for controlling the amount of the working fluid in the clutch actuator, and a flow rate control valve control device for controlling the position of a valve body of the flow rate control valve responsive to a detection signal from the stroke sensor;

the flow rate control valve is connected to a communication passage communicated with the clutch actuator, to a pressure source passage communicated with a working fluid pressure source, and to a discharge passage for discharging the working fluid from the clutch actuator, and is provided with a valve actuator for operating the valve body, and, at the neutral position of the valve body, the communication flow passage is cut off from the pressure source passage and the discharge passage; and the flow rate control valve control device is provided with a neutral position learning device for learning the neutral position of the valve body, and the neutral position learning device decides, as a central point at the neutral position, a value obtained by averaging an operation amount of the valve actuator at a moment when an absolute value of a rate of change in the detection signal of the stroke sensor becomes smaller than a predetermined value while the detection signal of the stroke sensor is increasing and an operation amount of the valve actuator at a moment when the absolute value of the rate of change in the detection signal of the stroke sensor becomes smaller than the predetermined value while the detection signal of the stroke sensor is decreasing.

Here, the "operation amount" stands for an amount that is added by operating the valve actuator in order to vary the flow rate which is the control amount. The operation amount can be the amount of the electric current if the valve actuator is an electromagnetic solenoid and can be the number of pulses if a pulse motor is used as the valve actuator.

As described in claim 2, the neutral position learning device can be so constituted as to execute the learning when a rate of change in the detection signal of the stroke sensor becomes smaller than the predetermined value continuously for a predetermined period of time.

As described in claim 3, when the movement of the clutch actuator includes a maximum value that is mechanically limited, it is desired that the neutral position learning device executes the learning when the movement of the clutch actuator is greater than a predetermined value but is smaller than the maximum value.

As described in claim 4, the neutral position learning device can be so constituted as to render the transmission to be neutral when the vehicle is at a halt and operates the clutch actuator to execute the learning. In this case as described in claim 5, it is desired that the neutral position learning device learns the neural position of the valve body while the brake of the vehicle is being applied.

As described in claim 6, the flow rate control valve is provided with an electromagnetic solenoid for driving the valve body, and the operation amount is the amount of electric current that flows into a coil of the electromagnetic solenoid by being controlled by the flow rate control valve control device.

Effects of the Invention

When the single flow rate control valve is provided in the clutch control device and the working fluid is fed into, or discharged from, the clutch actuator through the flow rate control valve, the valve body in the flow rate control valve is displaced to one side from the neutral position to feed the working fluid, and is displaced to the other side to discharge the working fluid. The flow rate control valve control device of the invention is provided with the learning device for learning the neutral position, and learns, at all times, the operation amount of the valve actuator that becomes the central point at the neutral position of the flow rate control valve of which the neutral position has a width and includes a dead zone (e.g., learns the amount of electric current flowing into the coil of the electromagnetic solenoid). Even if the central point changes at the neutral position due to a difference inherent in the individual flow rate control valves or due to secular change, the amount of operating the valve actuator is corrected relying upon the central point stored in the learning device, and the position of the valve body in the flow rate control valve is correctly controlled so as to attain a target flow rate. It is, therefore, made possible to quickly and correctly change the rate of connection of the clutch at the time of gear shifting and to attain a clutch control without shift shock. In the case of a flow rate control valve without dead zone at the neutral position, the central point at the neutral position becomes the neutral position itself. It is, therefore, obvious that upon learning the neutral position, the amount of operating the valve actuator can similarly be corrected even in the flow rate control valve without dead zone.

Further, the neutral position learning device of the invention detects an absolute value of the rate of change in the detection signal of the stroke sensor, and separately detects the operation amount of the valve actuator at a moment when the absolute value becomes smaller than a predetermined value while the detection signal of the stroke sensor is increasing and the operation amount of the valve actuator at a moment when the absolute value becomes smaller than the predetermined value while the detection signal of the stroke sensor is decreasing. A value obtained by averaging the two operation amounts is decided to be a central point at the neutral position. At the neutral position of the flow rate control valve, the working fluid is neither fed to the clutch actuator nor discharged therefrom, and there is no change in the stroke of the clutch actuator. Basically, upon detecting the absolute value of the rate of change in the detection signal of the stroke sensor that becomes smaller than the predetermined value, the learning device of the present invention decides that the flow rate control valve is at the neutral position. The predetermined value is a value close to zero, and is set by taking into consideration the disturbance to the detection signal of the stroke sensor.

In the flow rate control valve which has a dead zone, however, the neutral position has a width, and a position where the valve body stops to maintain constant the stroke while the stroke of the clutch is being controlled may differ depending upon the direction in which the valve body moves. Namely, the position of the valve body of which the rate of change becomes zero while the detection signal of the stroke sensor is increasing (operation in the direction of disconnecting the clutch) is a position of FIG. 10(*b*), and the operation amount of the valve actuator at this moment (amount of electric current to the coil of the electromagnetic solenoid) becomes the amount of electric current that corresponds to a point P in FIG. 11. On the other hand, the position of the valve body of which the rate of change becomes zero while the detection signal of the stroke sensor is decreasing (operation in the direction of connecting the clutch) is a position of FIG. 10(c), and the operation amount of the valve actuator becomes the amount of electric current that corresponds to a point N in FIG. 11. In the case of the flow rate control valve which has the dead zone, therefore, it is not allowed to obtain correct data of the neutral position by simply detecting the rate of change in the stroke that becomes 0. On the other hand, the present invention separately detects the operation amounts of when the rate of change in the stroke becomes 0 in each of the directions in which the valve body moves, and finds the central point at the neutral position by averaging the operation amounts making it possible to property trace a change in the neutral position caused by secular change irrespective of the presence of the dead zone.

The stroke sensor used for the learning device of the present invention is a part that has heretofore been used in a clutch control device for controlling the rate of connection of the clutch. Therefore, the learning device of the present invention is capable of learning the central point at the neutral position without the need of providing any special part. Therefore, the control device as a whole can be simply constituted in a compact size.

Upon executing the learning when the absolute value of the rate of change in the detection signal of the stroke sensor becomes smaller than a predetermined value continuously for a predetermined period of time as the invention of claim 2, it is made possible to more reliably avoid a decrease in the accuracy of learning caused by disturbance.

The invention of claim 3 is intended for executing the learning of the neutral point of the valve body at its neutral position when the clutch is being operated. When the clutch actuator is not operated and is in a completely connected state, the flow rate control valve is not, usually, at its neutral position despite the rate of change in the stroke is 0. The clutch that is being operated can be discriminated by detecting the movement of the clutch actuator that is greater than a predetermined stroke. At the time of gear shifting, however, the clutch actuator is quickly brought to the position of disconnection and often collides with the stopper that mechanically limits the movement. In this case, too, therefore, the rate of change becomes 0 at a maximum stroke. Here, however, the flow rate control valve is not necessarily at its neutral position. The invention of claim 3, therefore, executes the learning of the neutral position of the valve body when the movement of the actuator is greater than the predetermined stroke but is less than a maximum value.

According to the present invention, to learn the central point of the flow rate control valve at its neutral position is to separately detect the operation amounts of when the rate of change in the stroke becomes 0 in each of the directions in which the valve body of the flow rate control valve moves. According to the invention of claim 4, the clutch is operated while rendering the transmission to be neutral and cutting off the transmission of power from the engine to the wheels in order to execute the learning while the vehicle is at a halt. It is, therefore, allowed to arbitrarily operate the clutch actuator to be suited for learning the central point of the flow rate control valve at its neutral position. By moving the clutch in the direction in which it is disconnected and in the direction in which it is connected before being brought into a halt, it is made possible to separately detect the operation amount at a moment when the rate of change becomes 0 while the detection signal of the stroke sensor is increasing and the operation amount at a moment when the rate of change becomes 0 while the detection signal thereof is decreasing. Many clutch control devices have been provided with a half-engage clutch learning device, i.e., a device for learning, at regular intervals, a change in the stroke at the half-engage clutch position caused by the wear of the clutch friction disk due to aging. The half-engage clutch state can be learned by executing the same operation as that of the invention of claim 4 while the vehicle is at a halt. The clutch control device equipped with the half-engage clutch learning device is capable of learning the neutral position of the flow rate control valve simultaneously with learning the half-engage clutch state.

The invention of claim 4 operates the clutch by temporarily rendering the transmission to be neutral while the vehicle is at a halt. It is, therefore, desired to execute the learning of the neutral position of the valve body while the brake of the vehicle is being applied as in the invention of claim 5. In this case, even if it happens that the operation is erroneously effected, the vehicle is prevented from moving unexpectedly, and the neutral position can be learned maintaining safety.

When use is made, as a flow rate control valve, of a proportional control valve driven by an electromagnetic solenoid, i.e., when use is made of a flow rate control valve which continuously varies the position of the valve body by controlling the electric current that flows into a coil of the electromagnetic solenoid by using a flow rate control valve control device, use of an electric control device makes it possible to realize a drive device and a control device of the flow rate control valve in small sizes.

BRIEF DESCRIPTION OF THE DRAWINGS

FIG. 7 is a diagram illustrating an embodiment of controlling the stroke of the clutch at the time of gear shifting.

MODE FOR CARRYING OUT THE INVENTION

Figure 6:
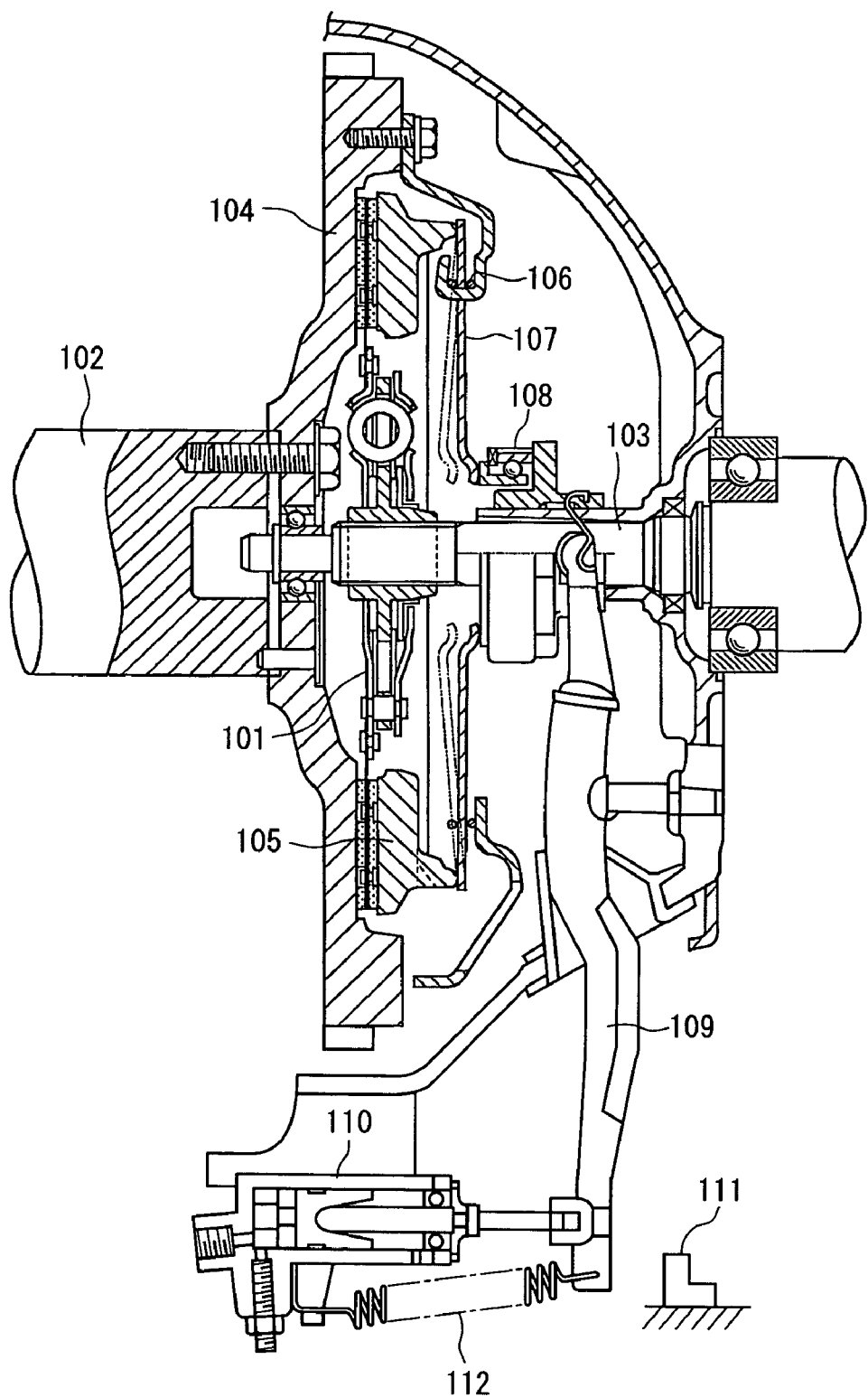
FIG. 6 is a view showing the constitution of a clutch for a vehicle.

A clutch control device for vehicles embodying the invention will now be described with reference to the drawings. However, the clutch for vehicles and equipment constituting the clutch control device to which the invention is applied, are not particularly different from the conventional devices shown in FIG. 6 and other drawings. That is, the clutch for vehicles operated by the clutch control device of the invention is basically the same as the clutch of FIG. 6, and is equipped with a clutch actuator 110 for varying the rate of connection of the clutch. A working fluid is fed to the clutch actuator 110 from a fluid pressure source, the rate of connection of the clutch is determined by the movement of a piston in the clutch actuator 110, and a maximum value of the movement is mechanically limited by a stopper 111.

Figure 1:
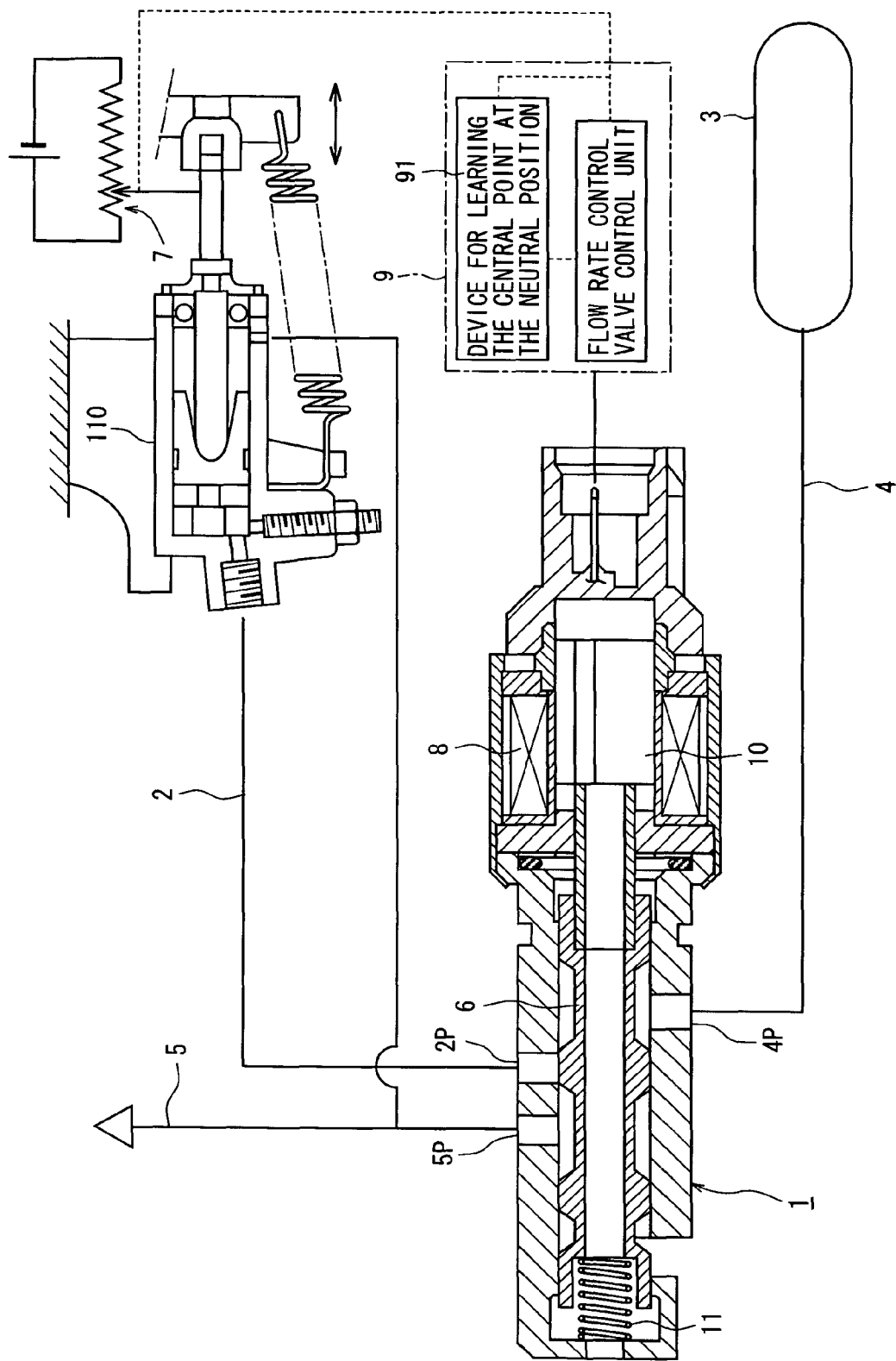
FIG. 1 is a circuit diagram of a clutch control device equipped with a learning device of the invention.
Figure 8:
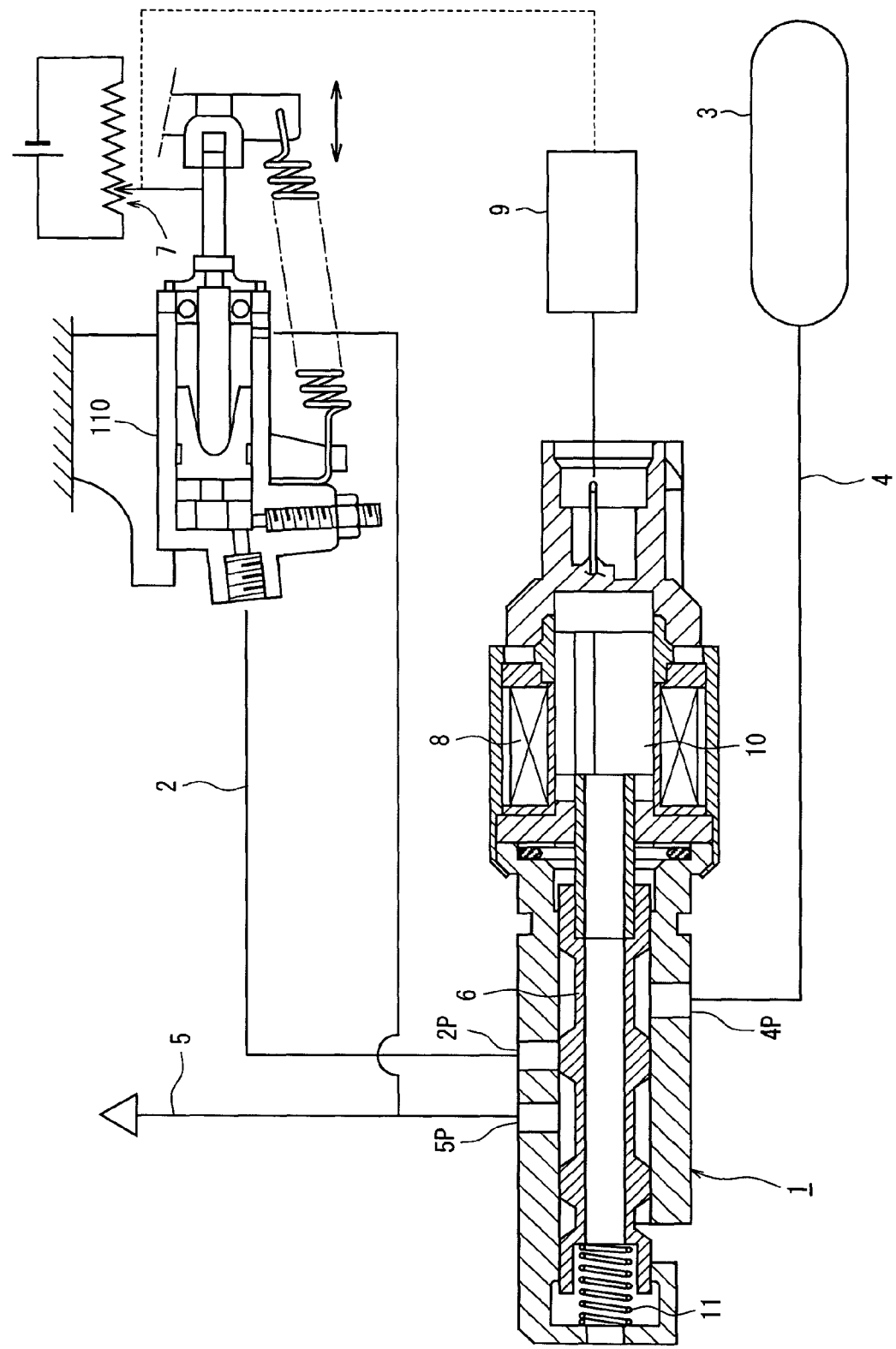
FIG. 8 is a circuit diagram of a conventional clutch control device.
Figure 9:
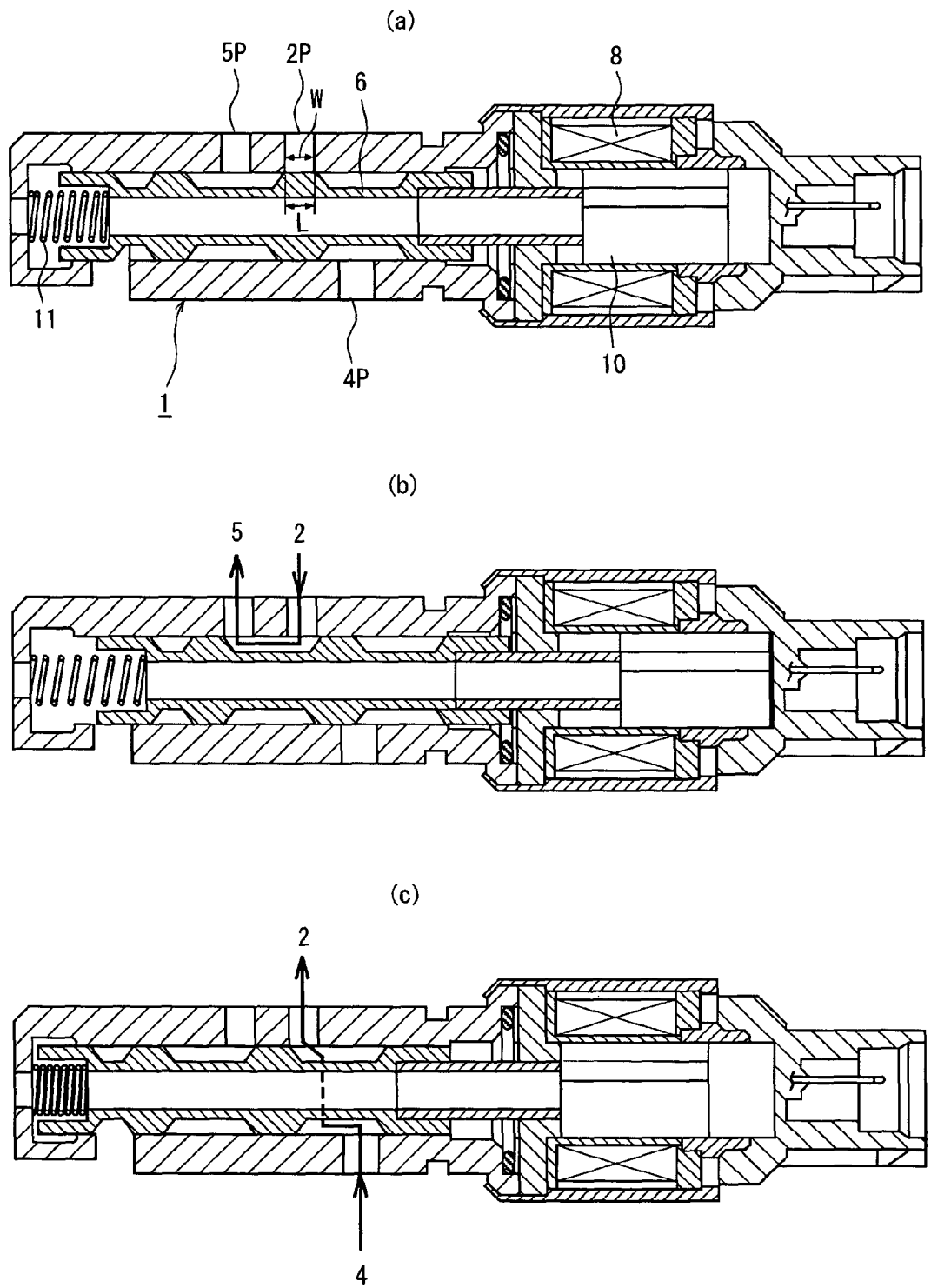
FIG. 9 is a view closely illustrating the operation of a flow rate control valve in the clutch control device.

FIG. 1 shows a circuit constitution of the clutch control device of the invention. Equipment constituting the circuit of FIG. 1 are the same as those of the conventional counterparts of FIG. 8 with regard to the so-called hardware, and the corresponding parts are denoted by the same reference numerals. The clutch control device includes a single flow rate control valve 1 driven by an electromagnetic solenoid, the flow rate control valve 1 being connected to a fluid pressure source 3 such as an air tank, to a clutch actuator 110 and to a discharge passage 5. A flow rate control valve control device 9 controls the amount of electric current flowing into a coil 8 of the electromagnetic solenoid which is a valve actuator to vary the position of a valve body 6, and varies the rate of connection of the clutch by feeding and discharging the working fluid into, and from, the clutch actuator 110. The movement (stroke) of the piston in the clutch actuator 110 is detected by a stroke sensor 7 and its signal is input to the flow rate control valve control device 9.

In the clutch control device of the invention, the flow rate control valve control device 9 is equipped with a device 91 for learning the central point at the neutral position. By using a signal of a stroke of the clutch actuator 110, the device 91 for learning the central point at the neutral position learns the amount of electric current flowing into the coil 8, that corresponds to the central point of the valve body at its neutral position at which the flow of the working fluid through the flow rate control valve 1 is cut off in order that the neutral position can be learned even when a dead zone is present in the flow rate control valve 1. The device 91 for learning the central point at the neutral position, too, receives the detection signal from the stroke sensor 7. The present invention detects an absolute value of the rate of change in the detection signal of the stroke sensor 7, and separately detects the amount of electric current at a moment when the absolute value becomes smaller than a predetermined value while the detection signal of the stroke sensor is increasing and the amount of electric current at a moment when the absolute value becomes smaller than the predetermined value while the detection signal of the stroke sensor is decreasing. A value obtained by averaging the two amounts of electric current is decided to be a central point at the neutral position. Here, the predetermined value is a small value so as to be capable of detecting the rate of change in the stroke which is substantially zero.

The device 91 for learning the central point at the neutral position according to the invention must find the amount of electric current of when the rate of change becomes 0 while the stroke of the clutch actuator 110 is increasing and the amount of electric current of when the rate of change becomes 0 while the stroke thereof is decreasing or, in other words, must find the amount of electric current of when the valve body 6 of the flow rate control valve 1 reaches the neutral position from the one direction and the amount of electric current of when it reaches the neutral position from the other direction. For this purpose, the device 91 for learning the central point at the neutral position of this embodiment renders the transmission to be neutral for a short period of time when the vehicle is at a halt, and operates the clutch actuator 110 to execute the learning.

The basic operation of the device 91 for learning the central point at the neutral position will be described with reference to a diagram of operation characteristics of FIG. 2 and a flowchart of FIG. 3. The learning device of this embodiment feeds an electric current to the coil 8 of the electromagnetic solenoid as shown in the lower diagram in FIG. 2 with the transmission being rendered to be neutral, varies the stroke of the clutch according to a pattern in the upper diagram in FIG. 2, and executes the operation of a flowchart of FIG. 3 at a predetermined operation period.

Figure 3:
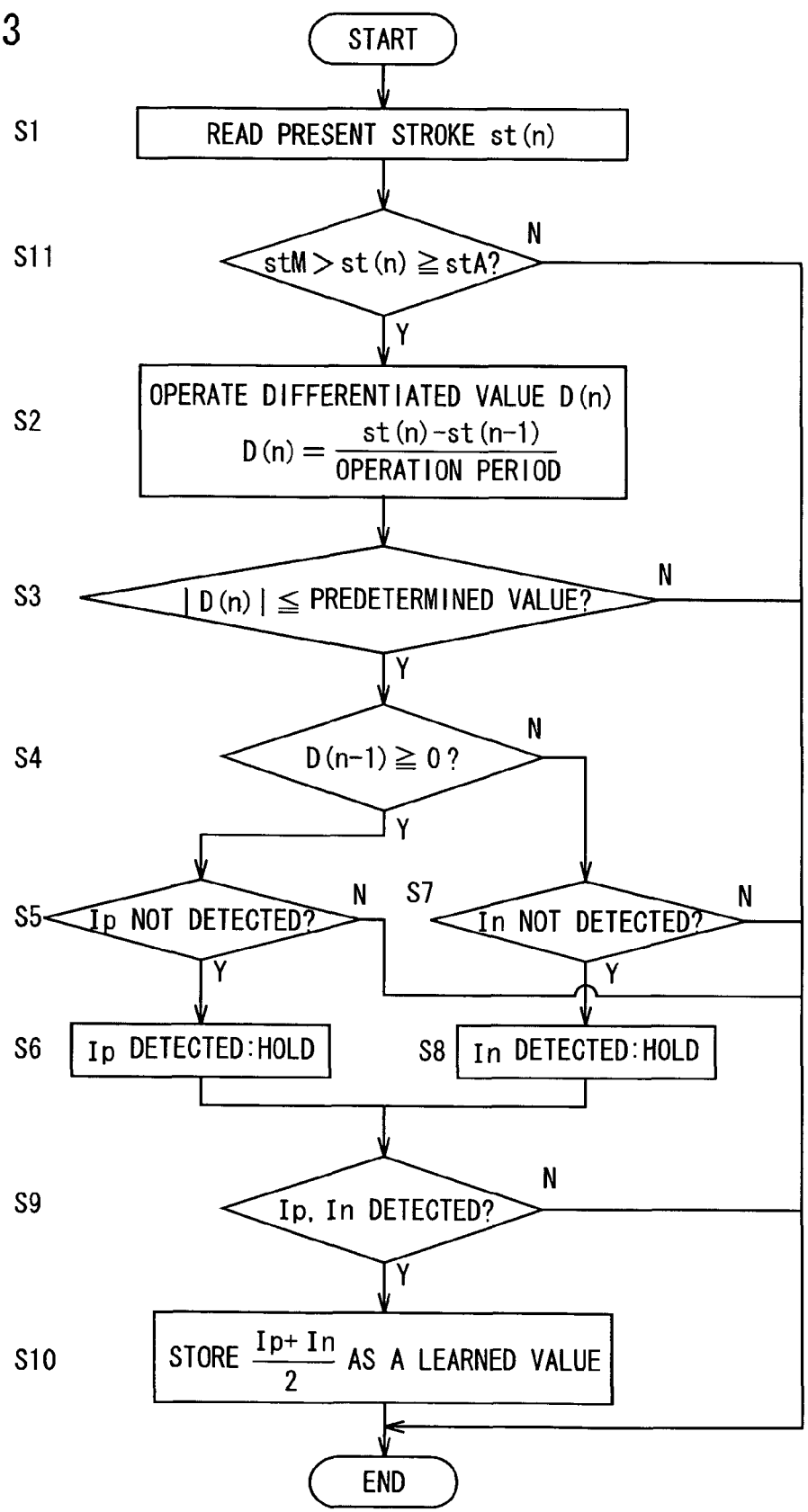
FIG. 3 is a basic flowchart of a device for learning the central point at the neutral position according to the invention.

In the flowchart of FIG. 3, a present stroke st(n) is read at step S1 from a detection signal of the stroke sensor 7, and it is decided at step S11 if the stroke st(n) is larger than a predetermined stroke (stA) but is smaller than a maximum value (stM) limited by the stopper 111. The decision is conducted because of the following reasons.

Namely, since the clutch is quickly disconnected at the time of learning, it often happens that the movement of the clutch actuator goes up to the maximum value (stM) limited by a stopper 111 passing over the position of complete disconnection. In this case, too, the rate of change in the stroke becomes 0 but the flow rate control valve 1 is not necessary at is neutral position. Therefore, it is confirmed that the flow rate control valve 1 is at its neutral position where the condition of step S11 is satisfied and, thereafter, the subsequent steps of operation processing are executed.

If the condition of step S11 is satisfied, the routine proceeds to step 2 to find a rate of change in the stroke. The learning device 91 is storing the stroke st(n-1) that was detected last time, and step S2 calculates a differentiated value D(n) which is the rate of change in the stroke, i.e., $$D(n)=(st(n)-st(n-1))/\text{operation period}$$

and stores D(n) which is a positive value or a negative value, i.e., the stroke which is increasing or decreasing. Next, it is decided at step S3 if the absolute value of D(n) is smaller than a predetermined value. The predetermined value has been set to a small value so that even if the detection varies to some extent due to disturbance, the rate of change in the stroke that is 0 can be detected. If the absolute value of D(n) at step S3 is larger than the predetermined value, it is regarded that the flow rate control valve 1 is not at its neutral position and the operation ends.

Figure 10:
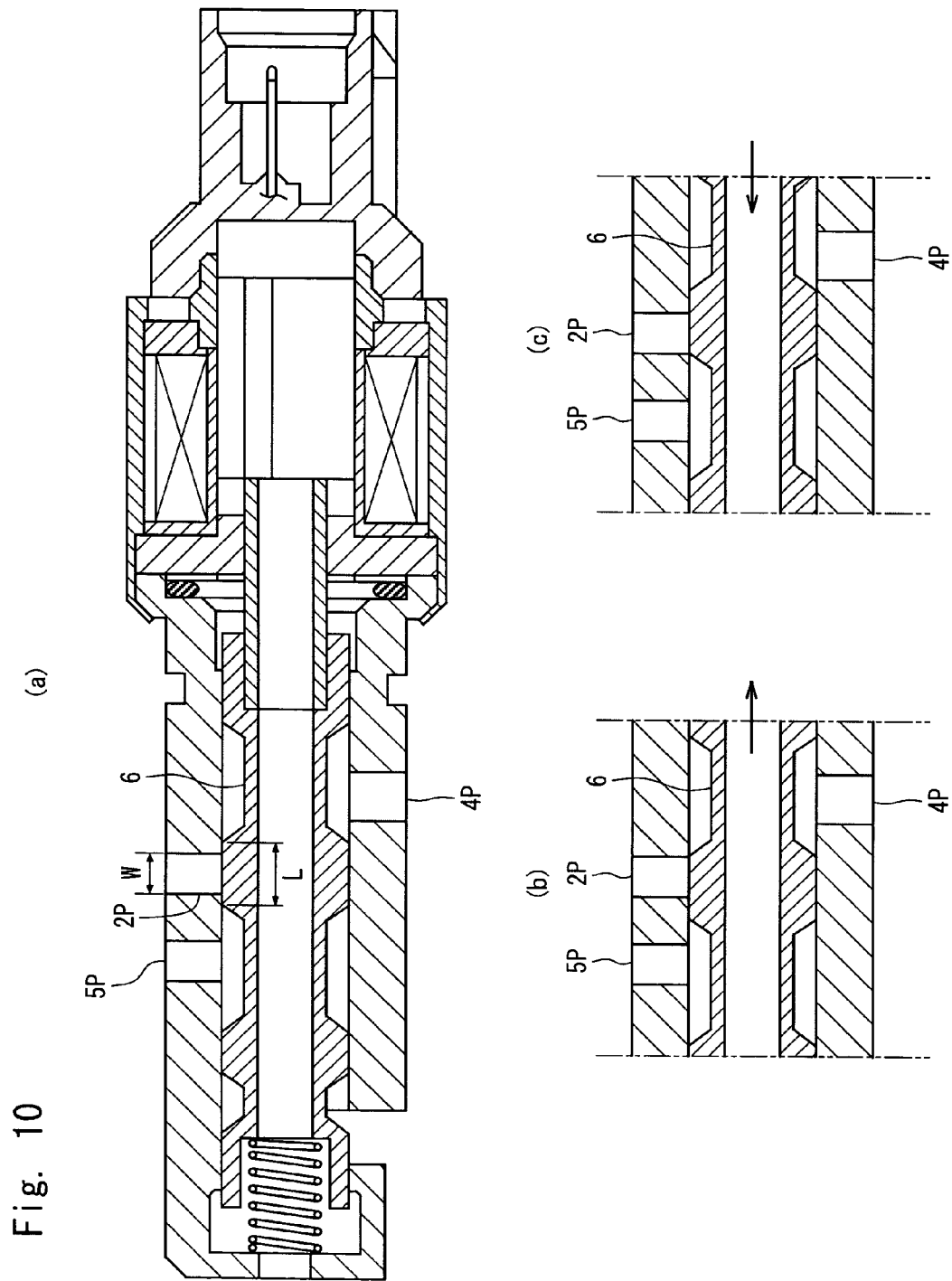
FIG. 10 is a view closely illustrating the operation of a flow rate control valve in which a dead zone is present.

If it is decided at step S3 that the absolute value of D(n) is smaller than the predetermined value, the routine proceeds to step 4 where it is decided if the differentiated value D(n-1) operated last time is a positive value or 0. If the decision is YES, then the stroke has increased and the rate of change thereof is now 0; i.e., the stroke is at a point stP in FIG. 2 where the clutch is at a halt at its completely disconnected position, and the valve body 6 of the flow rate control valve 1 is at an end at the neutral position thereof as shown in FIG. 10(b). Therefore, if the decision at step S4 becomes YES for the first time, the routine proceeds to step S6 to detect the amount of electric current Ip to the coil 8 at that moment, to raise the flag of having detected (for the decision at step S5) and to hold the amount of electric current Ip. In the subsequent arithmetic operation, the decisions at steps S3 and S4 are YESs since the clutch is maintained at its completely disconnected position. However, since the amount of electric current Ip has been detected already, the decision at step S5 becomes NO and the amount of electric current is not detected.

Figure 2:
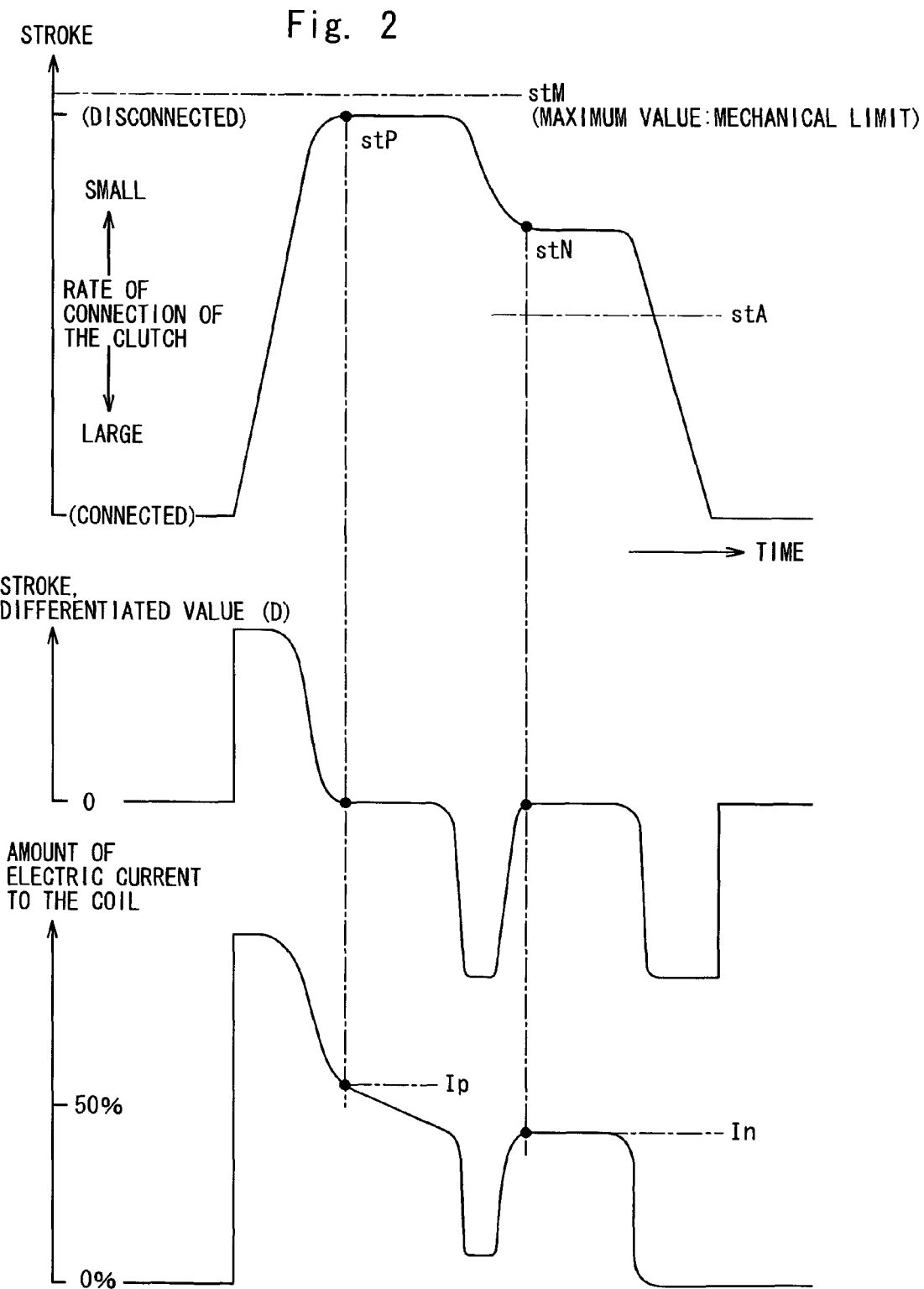
FIG. 2 is a diagram illustrating the operation of the learning device of the invention.

In operating the clutch for learning, if the clutch is moved from its completely disconnected position toward the direction of connection to decrease the stroke by a predetermined amount and if, thereafter, the rate of change in the stroke is brought to 0, then there is realized a state where the decision at step S3 becomes YES and the decision at step S4 becomes NO at a point stN in FIG. 2 which is an intermediate position of the stroke of the clutch, i.e., there is realized a state where the stroke decreases and its rate of change becomes 0. At this moment, the valve body 6 of the flow rate control valve 1 is at the other end at its neutral position as shown in FIG. 10(c). Therefore, if the decision at step S4 becomes NO for the first time, the routine proceeds to step S8 to detect the amount of electric current In to the coil 8 at that moment and to hold the amount of electric current In. At this moment, Ip has already been detected and held. Therefore, the routine proceeds from step S9 to step S10 where the amount of electric current Ic to the coil 8 corresponding to the central point at the neutral position is operated as, $$Ic=(Ip+In)/2$$

and is stored as a learned value. Here, the flowchart has been so constituted that if the amount of electric current In is once detected, no subsequent detection is effected at step S7. Even when there is employed a variation pattern of the stroke in which Ip and In are detected in opposite order, therefore, it is allowed to learn the amount of electric current at the central point at the neutral position.

By using the amount of electric current at the central point at the neutral position learned as described above, the device 91 for learning the central point at the neutral position corrects the past value of learning. The flow rate control valve control device 9 uses the updated value of learning to control the flow rate control valve 1. According to the present invention, since the central point at the neutral position is learned, errors in the flow rate characteristics caused by secular change or the like can be compensated despite the flow rate control valve 1 has a width at the neutral position and includes a dead zone in the flow rate characteristics thereof.

In the flowchart of FIG. 3, if the differentiated value D(n) operated at step S3 is smaller than a predetermined value, the amount of electric current at that moment is readily detected as the amount of electric current for determining the central point at the neutral position. On the other hand, if the differentiated value D(n) becomes smaller than the predetermined value consecutively a plurality of number of times, i.e., if the state where the rate of change in the stroke is 0 continues for a predetermined period of time, then a condition is added for detecting the amount of electric current (in this case, a differentiated value of before becoming 0 is used for the decision at step S4) in order to improve the accuracy of learning by precluding disturbance and the like effect.

Referring to FIG. 2 or 3, the central point of the flow rate control valve at its neutral position is learned while the vehicle is at a halt by rendering the transmission to be neutral for a short period of time. It is, therefore, desired to execute the learning when the learning conditions shown in the flowchart of FIG. 4 are holding.

Figure 4:
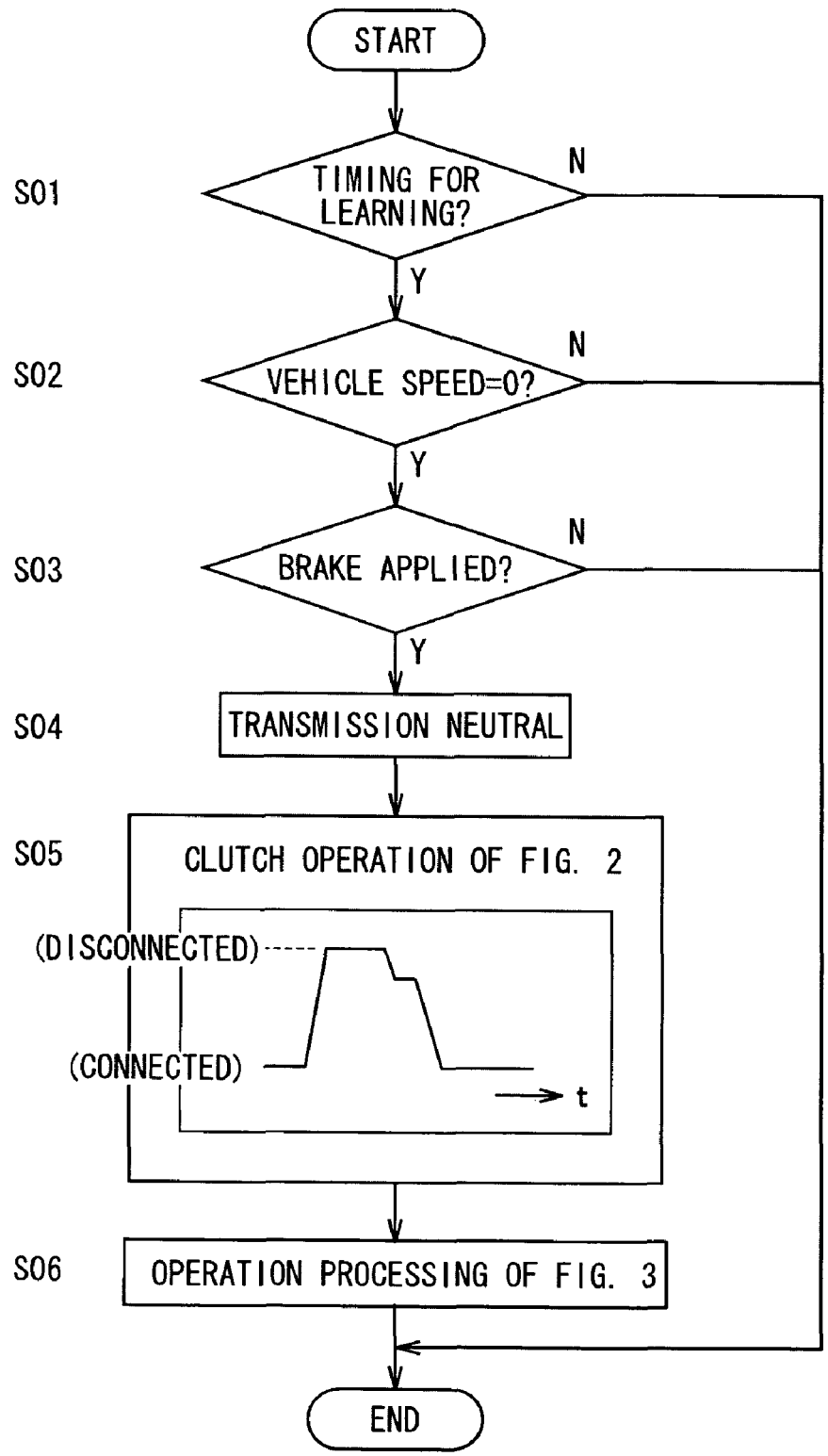
FIG. 4 is a flowchart illustrating the learning holding conditions according to an embodiment of the invention.

In the flowchart of FIG. 4, it is decided at step S01 if it is the timing for learning the neutral position. When the timing for learning has arrived, it is decided at step S02 if the vehicle is at a halt (vehicle speed=0) and, next, at step S03 if the brake of the vehicle is being applied. If the above learning conditions are holding, the state of the transmission is detected. If the transmission is not neutral, an instruction is output to a transmission control device to render the transmission to be neutral (S04). If rendered to be neutral, then no power is transmitted from the engine to the wheels and in this state, the clutch actuator 110 is driven by the flow rate control valve 1.

Namely, the clutch is disconnected and connected (S05) in compliance with the stroke pattern of FIG. 2, and the neutral position is learned according to the same procedure as that of the flowchart of FIG. 3.

According to this learning method, it is allowed to freely set the pattern of change in the stroke of the clutch and, therefore, to execute the learning correctly by setting a pattern that is adapted to learning the central point of the flow rate control valve at its neutral position. When the brake of the vehicle is being applied, further, the neutral position of the valve body is learned, and it does not happen that the vehicle starts moving unexpectedly. Therefore, the neutral position can be safely learned. The learning in the neutral state is completed in a short period of time without almost affecting the start of the vehicle.

The clutch control device is, usually, provided with a device for learning half-engage clutch to learn, at regular intervals, a change in the stroke at the half-engage clutch position caused by wear of a clutch friction disk due to aging. The state of half-engage clutch is learned by disconnecting and connecting the clutch when there hold the learning conditions similar to those in the flowchart of FIG. 4. Therefore, learning the neutral position by the flowchart of FIG. 4 can be executed simultaneously with learning the state of half-engage clutch.

According to the present invention, the central point of the flow rate control valve at its neutral position is learned by detecting both the amount of electric current at a moment when the rate of change becomes 0 while the stroke is increasing and the amount of electric current at a moment when the rate of change becomes 0 while the stroke is decreasing. In the above-mentioned embodiment, the learning is executed by rendering the transmission to be neutral while the vehicle is at a halt. At the start of the vehicle, however, it often happens that the gear is shifted by disconnecting the clutch and, thereafter, a predetermined stoke is maintained for a short period of time in the state of half-engage clutch. In this case, a pattern of change in the stroke becomes close to the one shown in the upper diagram in FIG. 2. According to the present invention, therefore, the central point at the neutral position can be learned not only when the vehicle is at a halt but also at the start of the vehicle.

Figure 5:
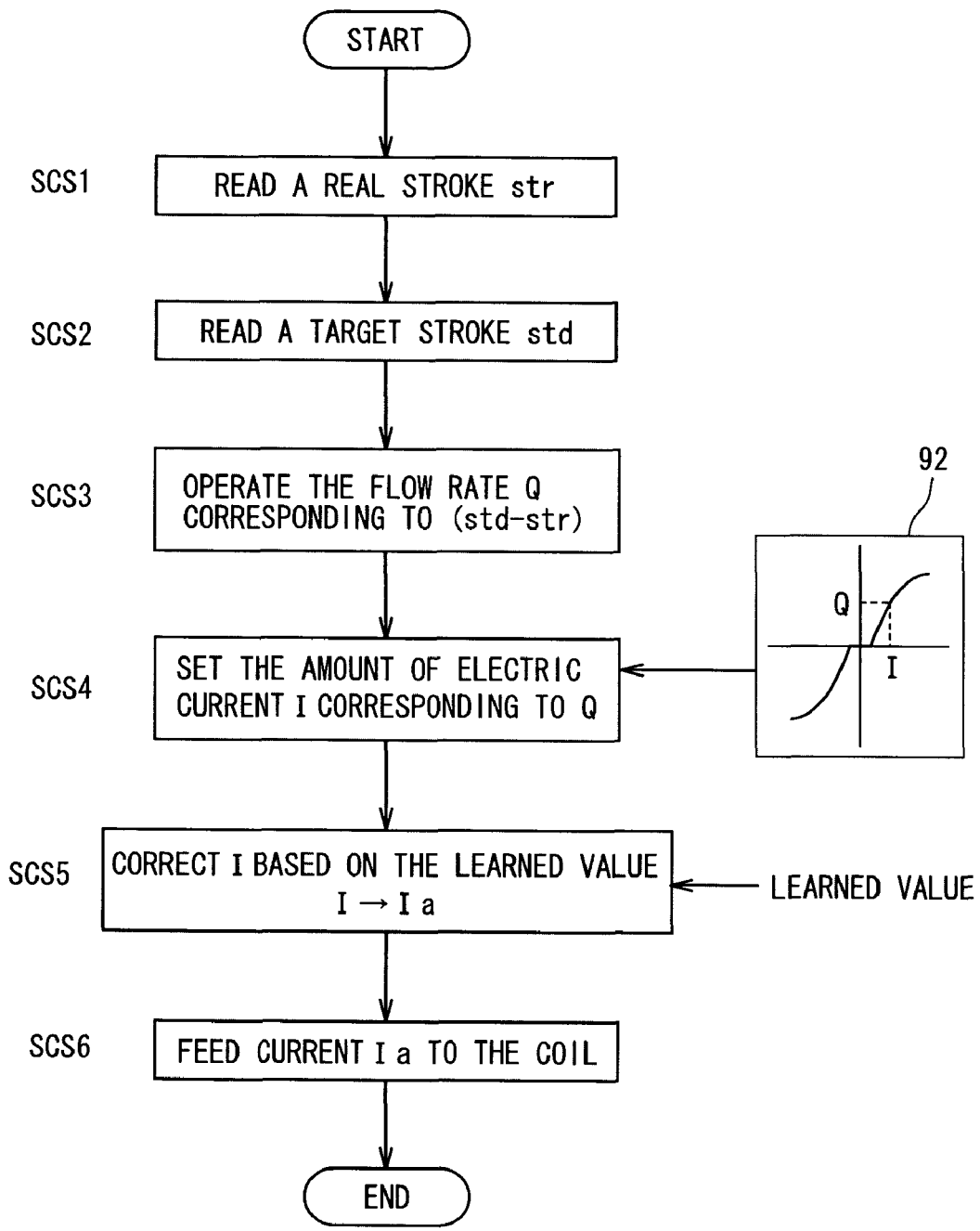
FIG. 5 is a flowchart of a stroke control in the clutch control device of the invention.

FIG. 5 shows an example of a flowchart for executing the stroke control of the clutch actuator by using the flow rate control valve control device equipped with the device for learning the central point at the neutral position according to the present invention.

In operating the clutch for gear shifting, the stroke (rate of connection of the clutch) is controlled so as to vary according to the pattern of FIG. 7 with the passage of time. The stroke control starts at a moment when a shift-change signal is generated from a shift lever or the like and at step SCS1, a real stroke str which is a detection signal of the stroke sensor 7 is read. At SCS2, the stroke after a predetermined period of time has passed is set as a target stroke std. At SCS3, the flow rate Q of the flow rate control valve 1 is operated depending upon a difference between the target stroke std and the real stroke str so as to attain the target stroke std after the passage of the predetermined period of time.

Figure 11:
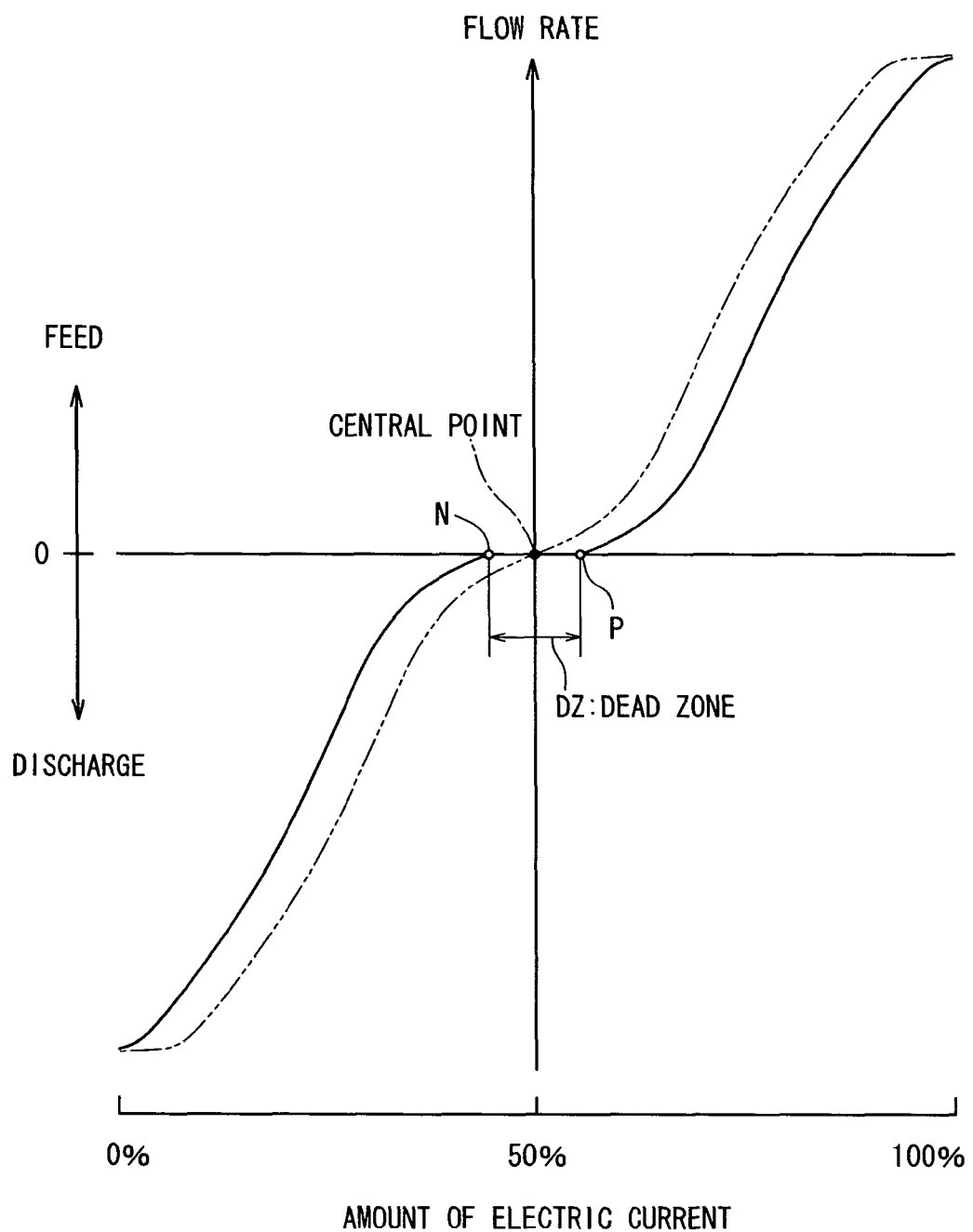
FIG. 11 is a diagram illustrating flow rate characteristics of the flow rate control valve.

The flow rate control valve control device 9 is storing a relationship between the flow rate and the amount of electric current to the coil 8, i.e., storing the flow rate characteristics represented by the solid line in FIG. 11 in the form of a map 92. At SCS4, the amount of the electric current I corresponding to the flow rate Q is determined by using the map 92. The flow rate control valve control device 9, on the other hand, is storing the amount of the electric current at the central point at the neutral position learned by the device 91 for learning the central point at the neutral position. At SCS5, the amount of the electric current I is corrected based on a difference between the amount of the electric current at the central point at the neutral position in the map 92 and the learned value. At SCS6, a corrected amount of electric current Ia is fed to the coil 8 of the electromagnetic solenoid. As a result, the valve body 6 in the flow rate control valve 1 assumes a position corrected by the learned value, and can be correctly corresponded to the required flow rate Q.

Figure 12:
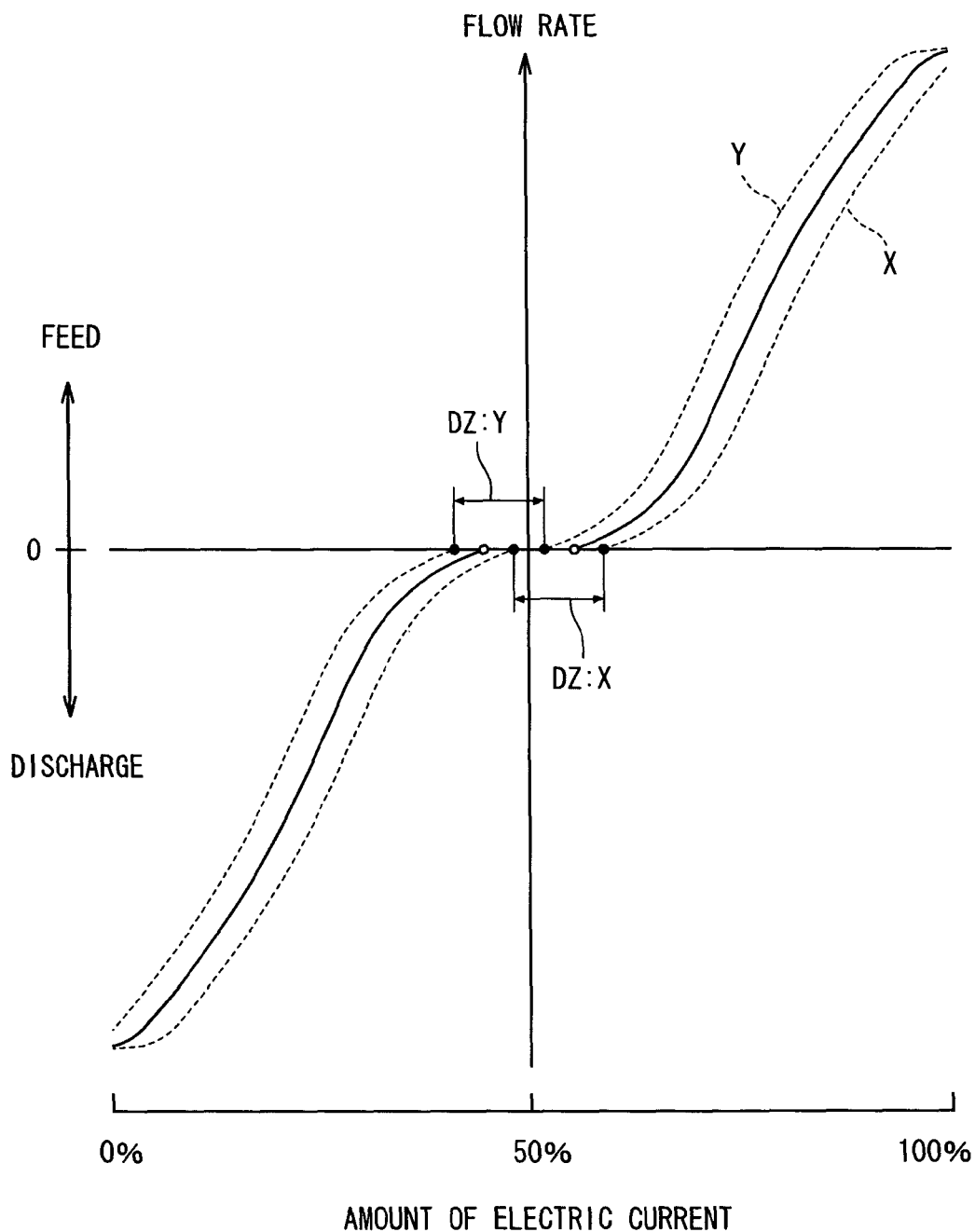
FIG. 12 is a diagram showing changes in the flow rate characteristics.

In this flowchart, the amount of electric current determined by the map 92 of flow rate characteristics is corrected by using the learned value. The amount of electric current, however, may be corrected by varying the flow rate characteristics of the map 92 based on the learned value as represented by broken lines in FIG. 12.

INDUSTRIAL APPLICABILITY

According to the present invention as described above in detail, the clutch control device that uses a single flow rate control valve is provided with a learning device for learning the central point of the flow rate control valve at its neutral position, the learning device detects an absolute value of the rate of change in the stroke and learns the operation amount at the central point at the neutral position by averaging the operation amount of the valve actuator at a moment when the absolute value becomes smaller than a predetermined value while the stroke is increasing and the operation amount thereof at a moment when the absolute value becomes smaller than the predetermined value while the stroke is decreasing. Therefore, the present invention can be industrially utilized as a clutch control device for vehicles being equipped with the clutch actuator that is driven by the pneumatic pressure or the hydraulic pressure.

Though the above embodiment has described the case of using the electromagnetic solenoid as the valve actuator and controlling the flow rate control valve by varying the amount of electric current to the coil, it is also allowable to use a pulse motor as the valve actuator. In this case, the number of pulses for driving the pulse motor becomes the operation amount. As the valve actuator, there may be used a hydraulic cylinder as described in the patent document 1. It will thus be obvious that the present invention can be put into practice in a variety of other ways in addition to the above-mentioned embodiment.

DESCRIPTION OF REFERENCE NUMERALS

1 flow rate control valve
2 communication passage
4 pressure source passage
5 discharge passage
6 valve body
7 stroke sensor
8 coil
9 flow rate control valve control device
91 device for learning the central point at the neutral position
110 clutch actuator
111 stopper

The invention claimed is:

1. A clutch control device in a power transmission device for vehicle having a clutch installed between an engine and a transmission, wherein:
    said clutch control device includes a clutch actuator driven by a working fluid, a stroke sensor for detecting the movement of said clutch actuator, a flow rate control valve for controlling the amount of the working fluid in said clutch actuator, and a flow rate control valve control device for controlling the position of a valve body of said flow rate control valve responsive to a detection signal from said stroke sensor;
    said flow rate control valve is connected to a communication passage communicated with said clutch actuator, to a pressure source passage communicated with a working fluid pressure source, and to a discharge passage for discharging the working fluid from said clutch actuator, and is provided with a valve actuator for operating said valve body, and, at the neutral position of said valve body, said communication flow passage is cut off from said pressure source passage and said discharge passage; and
    said flow rate control valve control device is provided with a neutral position learning device for learning the neutral position of said valve body, and said neutral position learning device decides, as a central point at the neutral position, a value obtained by averaging an operation amount of said valve actuator at a moment when an absolute value of a rate of change in the detection signal of said stroke sensor becomes smaller than a predetermined value while the detection signal of said stroke sensor is increasing and an operation amount of said valve actuator at a moment when the absolute value of the rate of change in the detection signal of said stroke sensor becomes smaller than the predetermined while the detection signal of said stroke sensor is decreasing.

2. The clutch control device according to claim 1, wherein said neutral position learning device executes the learning when an absolute value of a rate of change in the detection signal of said stroke sensor becomes smaller than the predetermined value continuously for a predetermined period of time.

3. The clutch control device according to claim 1, wherein the movement of said clutch actuator includes a maximum value that is mechanically limited, and said neutral position learning device executes the learning when the movement of said clutch actuator is greater than a predetermined stroke but is smaller than said maximum value.

4. The clutch control device according to claim 1, wherein said neutral position learning device renders the transmission to be neutral when the vehicle is at a halt and operates said clutch actuator to execute the learning.

5. The clutch control device according to claim 4, wherein said neutral position learning device executes the learning while the brake of the vehicle is being applied.

6. The clutch control device according to claim 1, wherein said flow rate control valve is provided with an electromagnetic solenoid for driving said valve body, and said operation amount is the amount of electric current that flows into a coil of said electromagnetic solenoid by being controlled by said flow rate control valve control device.

* * * * *